May 13, 1924.
C. F. VOSS
CORD FASTENER
Original Filed Sept. 1, 1921
1,493,832
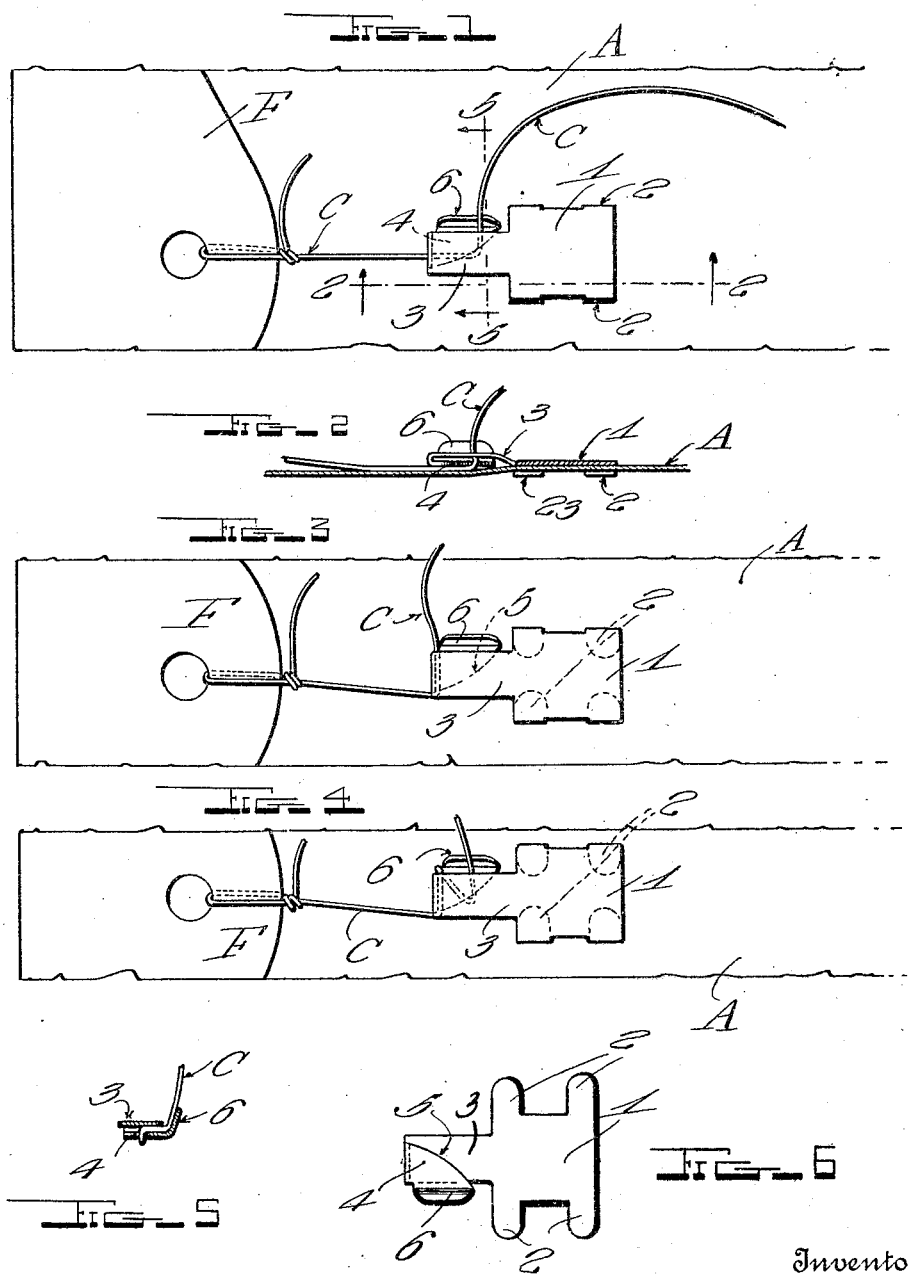
Inventor
Charles F. Voss
By H. B. Wilson & Co.
Attorneys Patented May 13, 1924.

1,493,832

UNITED STATES PATENT OFFICE.

CHARLES F. VOSS, OF NEW ORLEANS, LOUISIANA.

CORD FASTENER.

Application filed September 1, 1921, Serial No. 497,567. Renewed August 3, 1923.

*To all whom it may concern:*

Be it known that I, CHARLES F. VOSS, a citizen of the United States, residing at New Orleans in the parish of Orleans and State of Louisiana, have invented certain new and useful Improvements in Cord Fasteners; and I do declare the following to be a full, clear, and exact description of the invention, such as will enable others skilled in the art to which it appertains to make and use the same.

This invention relates to an improved article of manufacture which may be conveniently termed a cord fastener or anchor, the same being especially, but not necessarily designed for use in connection with large envelopes of the type used for holding phonograph records, papers and other articles, which type of envelopes have their flaps equipped with cords for quick attachment to a fastener carried by the body portion of the envelope. This is only one of the uses to which the improved device can be placed, it being obvious that it can be used in various other ways for fastening the ends of cord together and for other similar uses.

The principal object of the invention is to provide an inexpensive article of this class which is composed from a single metal stamping which is so constructed that it permits quick and easy attachment and detachment of the cord.

Another object of the invention is to provide a fastener of this class which includes a hook for frictionally gripping the cord, the underbent portion of the hook having one of its edges curved so that when the cord is pulled it will ride on this curved edge and insertion thereof into the hook thus facilitated.

Another object of the invention is to provide a hook embodying the construction above set forth, there being a flange carried by the underbent portion of the hook, this flange being so bent and positioned that it serves to guide the cord in place and also guards against accidental displacement of the cord.

Other objects and advantages of the invention will be apparent during the course of the following description.

In the accompanying drawings forming a part of this specification and in which like numerals are employed to designate like parts throughout the same.

Figure 1 is a top plan view of my improved cord fastener, showing the same attached to an envelope of the class mentioned, the initial step of fastening the cord being here shown.

Figure 2 is a sectional view of the device taken on the plane of the line 2—2 of Fig. 1.

Figures 3 and 4 are top plan views like Fig. 1 showing further steps taken in order to properly attach the cord to the hook.

Figure 5 is a detail sectional view taken substantially on the plane of the line 5—5 of Fig. 1.

Figure 6 is an enlarged bottom plan view of the device showing the anchoring tongues before they are bent.

In the drawings, the letter A designates an envelope of the larger type wherein the flap F is not glued when closed, but is provided with an opening through which the prongs of the usual fastener with which such types of envelopes are provided, are passed or through which a cord is passed and then anchored to a special fastener with which the body portion of the envelope is provided. In accordance with my ideas, the type of fasteners referred to are eliminated and my improved fastener substituted therefor.

The improved fastener referred to is composed of a single metal stamping, which in its preferred form includes a relatively wide plate-like part 1 which is provided at opposite edges with tongues 2 which, when the device is used with an envelope, are passed through slots formed in the latter and are bent upon themselves and against the inner face of the envelope. In addition to embodying this relatively wide part, the stamping includes an extension which is made up of a wide part 3 and a comparatively narrow part 4 which is gradually decreased in width from its point of connection with the part 3. In carrying out the invention, the part 4 is bent against and slightly spaced from the part 3 to form a cord-receiving hook which serves to frictionally bind the cord and hold it against slipping. As previously indicated, one edge of this underbent or narrow part of the hook is curved as shown at 5 and when the free end of the cord C is slipped between the parts 3 and 4 of the hook, it becomes engaged with the curved edge 5 and rides along this edge into the bend of the hook where it is frictionally gripped. Hence, insertion of the cord into the hook is greatly facilitated. To complete the article and render it most effective in use, I bend the free end of the underbent part of the hook as indicated to form a flange 6 which is spaced slightly from the adjacent edge of the part 3 of the hook. This flange serves in one instance to assist in guiding the cord into the hook and serves to assist in wrapping the cord and further serves to prevent accidental displacement of the cord.

In use, if the flap F of the envelope is not equipped with a piece of cord, it is only necessary to pass a piece of cord through the opening in the flap and tie it in a manner somewhat like that indicated in Figure 1. Then, slits are formed in the body portion of the rear side of the envelope at the proper or desired points and the tongues 2 of the improved cord fastener are passed through these slits and bent against the inner face of this side of the envelope. The fastener is thus anchored in place. Now, the cord is gripped and passed around the innermost point of the part 4 of the cord retaining hook. It may be stated here that this point of the part 4 terminates short of the wide part 1 of the device to provide a space through which the cord can be readily passed so that it can be drawn into the hook. Proceeding, it is to be said that by exerting a slight pull on the end of the cord, the latter will be drawn onto the curved edge 5 and will ride into the bend of the hook so that it then assumes a position indicated in Fig. 3. To guard against possible slipping or displacement of the cord, the end of it is again taken across the under side of the part 4 of the hook and the operation above outlined repeated. This operation may be again repeated to insure against possible slipping or loosening of the cord.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the subjoined claims may be resorted to if desired.

I claim:

1. A device of the class described comprising a strip of metal bent upon itself to form a cord-receiving hook, one edge of the bent portion of the latter being curved to cause the cord to ride thereon into the bend of the hook.

2. The structure set forth in claim 1, together with a combined cord guard and guide.

3. A device of the class described comprising a strip of metal bent upon itself to form a cord receiving hook, said strip being equipped with tongues by means of which it is attached to an article, one edge of the bent portion of said hook being curved so that when the cord is drawn, it will ride along said edge and into the bend of the hook, the outer end of said bent part of the hook being directed laterally to provide a flange which assists in guiding the cord into the hook and guards against displacement of the cord from the hook.

4. A cord fastening device of the class described comprising a metal stamping including a relatively wide plate-like part having tongues along its opposite edges designed to anchor the device to an envelope or the like, said stamping also including an extension which in turn includes a relatively wide and narrow part, said narrow part being bent against and slightly spaced from said wide part to form a hook, one edge of said narrow part being curved to assist in placing the cord in the hook, the extremity of said narrow portion being bent to provide a guard and guide flange.

5. A cord fastener embodying a cord receiving hook having a combined guide and guard flange and a curved edge extending therefrom to the bight portion, the cord being intended to be engaged with said edge so that when it is drawn upon it will ride along said edge into the bight portion of the hook.

In testimony whereof I have hereunto set my hand.

CHARLES F. VOSS.